Patented Oct. 30, 1923.

1,472,359

UNITED STATES PATENT OFFICE.

WILLIAM H. FINKELDEY AND WILLIS McG. PEIRCE, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF DRY-BATTERY CANS.

No Drawing. Application filed January 12, 1922. Serial No. 528,366.

*To all whom it may concern:*

Be it known that we, WILLIAM H. FINKELDEY and WILLIS McG. PEIRCE, citizens of the United States, residing at Palmerton, county of Carbon, and State of Pennsylvania, have invented certain new and useful Improvements in the Manufacture of Dry-Battery Cans; and we do hereby declare the following to be a full, clear, and exact description of the invention, such as will enable others skilled in the art to which it appertains to make and use the same.

This invention relates to the manufacture of zinc cans or containers for dry cells or batteries and has for its object the provision of certain improvements in the manufacture of such zinc cans or containers.

The present invention is concerned particularly with dry battery cans or containers made up of sheet zinc and having a soldered seam. In general, such cans comprise a body portion of rolled sheet zinc of appropriate configuration with its longitudinal ends overlapping and appropriately soldered together and having its bottom closed by an appropriately shaped piece of sheet zinc soldered to the body portion of the can. Considerable difficulty has heretofore been encountered by manufacturers and users of dry batteries having zinc cans of this description by the splitting of the can near the soldered side or longitudinal seam. Very often this splitting in immediate proximity to the soldered seam of the zinc can will develop two or three days after the can has been filled. The present invention contemplates the provision, as a new article of manufacture, of a dry battery having a zinc can of the aforementioned type in which there is no greater tendency to split at the soldered seam than at any other part of the zinc can. The invention also contemplates an improvement in the manufacture of zinc cans for dry batteries as a result of which the zinc in immediate proximity to the soldered seam is as resistant to splitting as any other portion of the zinc can.

The present invention is based upon our discovery that in the heretofore customary methods of soldering zinc cans, the zinc in immediate proximity to the soldered seam is weakened, that is, its tensile strength is lowered, probably due to annealing (or some similar thermal effect on the zinc) as a result of the relatively high temperature to which the zinc is heated in the course of the soldering operation. It has heretofore been the general practice in the manufacture of soldered zinc cans for dry batteries to employ a lead-tin solder (for example, 55% lead and 45% tin) having a melting point around 200° C. We have determined that the temperature to which the zinc is raised locally in soldering with a solder having such a melting point, namely about 200° C., so anneals the zinc that its tensile strength is very substantially lowered. This lowering of tensile strength, as a result of the annealing of the zinc during soldering, we find to be accentuated in the case of dry batteries in which the electrolyte contains a salt of mercury. Accordingly, as a result of our researches and investigations, we have determined that the weakening of the zinc in immediate proximity to the soldered seam, and consequent splitting of the finished battery at such seam, may be attributed to either or both of the following conditions: (1) an annealing effect caused by the heat of the soldering operation, and (2) a weakening of the zinc due to amalgamation, that is, action of the salt of mercury on the zinc.

The following table is representative of the results which we have obtained in the course of an extended investigation on this subject. The tensile strength of unannealed sheet zinc was first determined, and then the tensile strengths of two samples of the same sheet zinc material were determined after annealing for five seconds at 300° C. in one case and for thirty seconds at 300° C. in the other case, our researches having shown that with a solder melting around 200° C. the zinc being soldered may attain locally a temperature of about 300° C. A similar series of tests were made amalgamating the zinc with various quantities of mercury, namely, the normal amount generally used in the manufacture of dry cells and two, three and four times this amount. A summary of the results is given in the following table:

*Effect on tensile strength of sheet battery zinc or annealing—with and without various degrees of amalgamation.*

| Grams HgCl₂ per can | 0 | 0.05 | 0.10 | 0.15 | 0.20 |
|---|---|---|---|---|---|
| Unannealed | 27,700 | 25,900 | 25,500 | 23,000 | 23,900 |
| Annealed 5 sec. 300° C | 20,800 | 18,000 | 13,300 | 9,000 | 10,300 |
| Annealed 30 " 309° C | 21,000 | 19,700 | 12,600 | 9,000 | 9,400 |

Two facts are strikingly apparent from the foregoing table. In the first place, it appears that the unannealed material shows only a slight reduction in strength after amalgamation with the normal quantity of mercury (0.05 grams per can). In the second place, it appears that increasing the quantity of mercury used in amalgamation does not affect the strength of the unannealed zinc to anywhere near the same extent as similar amalgamation in the case of the annealed zinc.

As a result of our investigations, we have accordingly discovered that zinc battery cans are weakened in immediate proximity to the soldered seam because of the annealing effect due to the heat of the soldering operation, and that if the soldering operation is carried on at a temperature so low that only slight annealing occurs, there is no substantial weakening of the zinc at or near the soldered seam. Our present invention is based upon these discoveries and involves forming the soldered seam of the sheet zinc dry battery can at a temperature below that at which the zinc becomes seriously annealed with consequent substantial decrease in its tensile strength. In other words, the present invention contemplates forming the soldered seam of the zinc battery can at a working temperature sufficiently low to inhibit any substantial deleterious effect upon the tensile strength of the zinc.

As a result of our investigations, we have also discovered that the weakening effect of amalgamation is less with unannealed zinc than with annealed zinc and that if the soldering operation of the zinc can is carried on at so low a temperature that the annealing effect is greatly reduced, a materially better product results. In other words, if the soldering operation of the zinc battery can is carried on at a temperature so low that annealing of the zinc is to a large extent prevented, the quantity of mercury used in amalgamation may be materially increased witnout reducing the resistance of the battery can to splitting. Thus, by the practice of the present invention, it is possible to use greater quantities of mercury for amalgamation than heretofore, and with a very much decreased number of splitting cans. In fact, as indicated by the foregoing table, we have found that soldering of the zinc battery can in accordance with the present invention permits the use of three times the heretofore customary quantity of mercury used for amalgamation and without materially lowering the strength of the can.

In carrying out the present invention, the seams in the zinc battery can are soldered at a temperature sufficiently low so as to prevent the deleterious annealing of the zinc. In practice, we prefer that the soldering operation be conducted at such a temperature that the zinc does not locally reach a temperature above 200° C. We have secured excellent results in practice by forming the soldered seam of the zinc can with a solder made up of 40% lead, 40% tin and 20% cadmium. A solder of this composition has a relatively low melting temperature and an average working temperature (for the soldering operations) of approximately 150-200° C.

The following comparative investigations clearly indicate the advantages resulting from the practice of the present invention. These investigations are represented in tabulated form and show the tensile strengths of specimens of sheet battery zinc having a soldered lap joint, similar to the soldered seam of a dry battery can, the specimens being respectively soldered with the high working temperature solder heretofore commonly employed in the industry and the low working temperature solder employed in the practice of the invention. In explanation of the following table, it should be pointed out that the failure of the test specimen may occur by the breaking of the zinc or by the breaking of the soldered seam, depending upon which is the stronger. This is equally true in the case of the splitting battery cans.

*Tensile strengths of specimens of sheet battery zinc soldered with high and low temperature melting solders.*

UNAMALGAMATED.

| Kind of solder. | Tensile st. lbs. sq. in. zinc. | Break load zinc. | Number breaks through zinc. | Break load seam. | Number breaks through seam. |
|---|---|---|---|---|---|
| High | 21,400 | 171 | 5 |  | 0 |
| Low |  |  | 0 | 194 | 5 |

AMALGAMATED—*0.05 grams HgCl₂*.

| High | 20,400 | 163 | 4 | 145 | 1 |
| Low | 23,900 | 191 | 1 | 188 | 4 |

AMALGAMATED—*0.15 grams HgCl₂*.

| High | 18,400 | 147 | 5 |  | 0 |
| Low | 21,800 | 174 | 4 | 134 | 1 |

The results given in the foregoing table indicate clearly that the use of a low working temperature solder leaves the zinc in a stronger condition after soldering than is the case when a high working temperature solder is used. For example, all five specimens broke through the zinc when soldered with high working temperature solder, giving an average tensile strength of 21,400 pounds per square inch and an average breaking load of 171 pounds. With this same material using a low working temperature solder, all five specimens broke through the seam with an average breaking load of 194 pounds, thus indicating that in this case the zinc was either unannealed or its strength lowered so little after soldering that it was strained enough to cause failure to take place through the soldered seam at an average breaking load twenty-three pounds greater than the average breaking load of the specimens soldered with high working temperature solder.

Similar improvements in strength are apparent in the case of the amalgamated specimens. Even after amalgamating with three times the normal quantity of mercury, the specimens soldered with the low working temperature solder show average tensile strength and breaking load greater than the unamalgamated specimens soldered with the high working temperature solder.

It is in some cases highly desirable from a battery manufacturer's standpoint to increase the quantity of mercury used in amalgamation. Under the present practice of manufacturing dry batteries, using high working temperature solder, any increase in the quantity of mercury used in amalgamation would cause a greater weakening of the zinc than now takes place, and consequently a greater number of split cans. As a result of our investigations, we have determined that where the soldering of the zinc cans is conducted in accordance with the principles of the present invention, three times the normal quantity of mercury can be used in amalgamating the zinc, without seriously lowering the strength of the can, since, by the practice of the invention not only is the lowering of strength due to heavy annealing avoided but the weakening effect of amalgamation is less with unannealed zinc than in the case of annealed zinc.

We claim:—

1. The improvement in the manufacture of dry battery cans made up of sheet or strip zinc and having a soldered seam which comprises forming the soldered seam of the zinc can at a temperature below that at which the zinc becomes annealed with consequent substantial decrease in tensile strength.

2. The improvement in the manufacture of dry battery cans made up of sheet or strip zinc and having a soldered seam which comprises forming the soldered seam of the zinc can under conditions which necessitate subjecting the zinc to temperatures not higher than 200° C.

3. The improvement in the manufacture of dry battery cans made up of sheet or strip zinc and having a soldered seam which comprises forming the seam with a solder which can be worked at such a temperature that the zinc being soldered does not reach a temperature above 200° C.

4. The improvement in the manufacture of dry battery cans made up of sheet or strip zinc and having a soldered seam which comprises forming the soldered seam of the zinc can at a working temperature sufficiently low to inhibit any substantial deleterious effect upon the tensile strength of the zinc.

5. The improvement in the manufacture of cans made up of sheet or strip zinc and having a soldered seam for dry batteries in which the electrolyte thereof contains a salt of mercury which comprises forming the soldered seam of the zinc can at a temperature below that at which the zinc becomes annealed with consequent substantial decrease in tensile strength.

6. The improvement in the manufacture of cans made up of sheet or strip zinc and having a soldered seam for dry batteries in which the electrolyte thereof contains a salt of mercury which comprises forming the soldered seam of the zinc can under conditions which necessitate subjecting the zinc to temperatures not above 200° C. whereby the tensile strength of the zinc is not substantially impaired by annealing or by amalgamation.

7. The improvement in the manufacture of cans made up of sheet or strip zinc and having a soldered seam for dry batteries in which the electrolyte thereof contains a salt of mercury which comprises forming the soldered seam of the zinc can at a working temperature sufficiently low to inhibit any substantial deleterious effect upon the tensile strength of the zinc.

8. As a new article of manufacture, a dry battery comprising a can made up of sheet or strip zinc and having a soldered seam characterized in that the tensile strength of the battery can in immediate proximity to the seam is not less than the tensile strength of the seamless portion of the zinc can.

9. As a new article of manufacture, a dry battery comprising a can made up of sheet or strip zinc and having a soldered seam and an electrolyte containing a salt of mercury characterized in that the tensile strength of the zinc in immediate proximity to the seam is not less than the tensile strength of the seamless portion of the zinc can.

In testimony whereof we affix our signatures.

WILLIAM H. FINKELDEY.
WILLIS McG. PEIRCE.